(12) United States Patent
Johnson

(10) Patent No.: US 11,511,674 B2
(45) Date of Patent: *Nov. 29, 2022

(54) MULTIPURPOSE RAIL SYSTEM

(71) Applicant: Ron Johnson, Grand Junction, CO (US)

(72) Inventor: Ron Johnson, Grand Junction, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,351

(22) Filed: May 10, 2022

(65) Prior Publication Data

US 2022/0266758 A1 Aug. 25, 2022

Related U.S. Application Data

(63) Continuation of application No. 16/849,500, filed on Apr. 15, 2020, now Pat. No. 11,351,925.

(60) Provisional application No. 62/834,393, filed on Apr. 15, 2019.

(51) Int. Cl.
| | |
|---|---|
| *B60R 9/02* | (2006.01) |
| *A47B 96/06* | (2006.01) |
| *B60R 11/00* | (2006.01) |
| *B60P 7/08* | (2006.01) |
| *B25H 3/04* | (2006.01) |

(52) U.S. Cl.
CPC ............. *B60R 9/02* (2013.01); *A47B 96/067* (2013.01); *B25H 3/04* (2013.01); *B60P 7/0815* (2013.01); *B60R 2011/004* (2013.01)

(58) Field of Classification Search
CPC ....... B60R 9/00; B60R 9/02; B60R 2011/004; B60R 7/08; A47B 96/06; A47B 96/067; B60P 7/0815; A47F 5/08; A47F 5/0853; A61G 12/005; B25H 3/04
USPC ............. 248/220.21, 223.31, 224.8, 225.11, 248/220.22, 220.31, 220.41, 225.21; 211/94.01; 224/543, 547
See application file for complete search history.

(56) References Cited

U.S. PATENT DOCUMENTS

| | | | | |
|---|---|---|---|---|
| 2,805,777 | A * | 9/1957 | Larson | B25H 3/04 211/106.01 |
| 3,025,122 | A * | 3/1962 | Millman | A47B 96/061 248/225.11 |
| 3,116,702 | A * | 1/1964 | Stough | B60P 7/0815 410/89 |
| 3,713,616 | A * | 1/1973 | Bowers | B63B 25/002 410/105 |
| 3,785,426 | A * | 1/1974 | Sperling | A47H 13/14 248/225.11 |
| 4,869,378 | A * | 9/1989 | Miller | A61G 12/005 248/225.11 |
| D309,560 | S * | 7/1990 | Warlick | D8/355 |

(Continued)

*Primary Examiner* — Justin M Larson
(74) *Attorney, Agent, or Firm* — Leyendecker & Lemire, LLC

(57) ABSTRACT

A multipurpose rail system is described. Embodiments of the multipurpose rail system can include, but is not limited to, one or more rails and one or more accessories configured to removably couple to the one or more rails. The one or more rails are configured to be secured to a variety of different objects and provide a means for attaching an accessory proximate the object. For instance, a rail may be coupled to a side of a recreational vehicle so that kitchen accessories may be removably secured to the side of the recreational vehicle.

15 Claims, 8 Drawing Sheets

(56) References Cited

U.S. PATENT DOCUMENTS

| | | | | |
|---|---|---|---|---|
| 5,180,089 A * | 1/1993 | Suman | ................... | B60N 3/00 296/153 |
| 5,687,856 A * | 11/1997 | Kendrena | ............. | A47L 13/512 211/94.01 |
| D398,835 S * | 9/1998 | Coll | ................ | D8/354 |
| 6,119,878 A * | 9/2000 | Zen | ................ | A47F 5/0846 248/222.51 |
| 6,270,137 B1 * | 8/2001 | Minix | ................ | B60P 3/36 312/246 |
| 6,499,608 B1 * | 12/2002 | Sterling | ............... | A47B 96/027 211/70.1 |
| 7,195,218 B2 * | 3/2007 | James | ................. | A47B 61/003 248/300 |
| 7,210,660 B2 * | 5/2007 | James | ................. | A47F 5/0823 312/351 |
| D566,444 S * | 4/2008 | Grey | .............. | D6/553 |
| 7,568,754 B2 * | 8/2009 | Adams | .............. | B62D 25/2054 296/184.1 |
| 7,722,002 B2 * | 5/2010 | O'Keene | ........ | F16M 13/02 248/220.21 |
| 7,806,308 B2 * | 10/2010 | Gunn | ................ | B60R 9/06 248/222.51 |
| 7,871,048 B2 * | 1/2011 | Sculler | ................ | F16M 13/02 248/220.21 |
| 8,096,741 B2 * | 1/2012 | Denton | ............... | B60R 7/04 410/104 |
| 8,505,794 B2 * | 8/2013 | Ardigo | .............. | B60R 7/08 224/543 |
| 8,596,473 B2 * | 12/2013 | Newbould | ............ | A47K 1/09 211/88.01 |
| 8,882,065 B2 * | 11/2014 | Henriott | ............. | A47B 96/067 248/220.21 |
| D718,884 S * | 12/2014 | Thrush | .............. | D25/125 |
| 9,346,392 B1 * | 5/2016 | Neal | ........... | B60P 7/0815 |
| 9,763,515 B2 | 9/2017 | Fratilla et al. | | |
| 9,969,317 B2 | 5/2018 | Eichstedt et al. | | |
| 10,136,767 B2 | 11/2018 | Hurley et al. | | |
| 10,178,789 B2 | 1/2019 | Krinitt et al. | | |
| D850,890 S * | 6/2019 | Cole | ............... | D8/354 |
| 10,307,313 B2 | 6/2019 | Schroeder et al. | | |
| 10,398,207 B2 | 9/2019 | Schroeder et al. | | |
| D879,217 S * | 3/2020 | Dunahay | ............. | D8/354 |
| 10,597,188 B2 | 3/2020 | Johnson | | |
| 10,814,791 B2 | 10/2020 | Dabel | | |
| D902,786 S | 11/2020 | Johnson | | |
| 10,940,972 B2 | 3/2021 | Johnson | | |
| 11,066,004 B2 | 7/2021 | Schroeder et al. | | |
| D951,761 S * | 5/2022 | Boberg | ................ | D8/382 |
| 11,351,925 B2 * | 6/2022 | Johnson | ................ | B60R 15/02 |
| 2003/0155474 A1 * | 8/2003 | Dean | ............. | G11B 33/124 248/300 |
| 2005/0204966 A1 * | 9/2005 | Bienick | ................. | A47B 57/48 248/220.21 |
| 2005/0247653 A1 * | 11/2005 | Brooks | ................ | A47F 5/0846 211/94.01 |
| 2008/0105802 A1 * | 5/2008 | Kirtland | ................ | B60R 7/08 24/457 |
| 2009/0206214 A1 * | 8/2009 | David | ................ | F16M 13/02 248/205.1 |
| 2010/0175332 A1 * | 7/2010 | Henriott | ............. | A47B 96/067 52/36.6 |
| 2011/0109129 A1 * | 5/2011 | Brill | .............. | B60N 3/103 297/188.04 |
| 2011/0127396 A1 * | 6/2011 | Parker | .............. | A47B 95/008 248/220.21 |
| 2011/0140499 A1 * | 6/2011 | Masters | ................ | A47C 9/06 248/220.21 |
| 2012/0056048 A1 * | 3/2012 | Yamvrias | ............. | F16B 39/00 248/74.1 |
| 2013/0334383 A1 * | 12/2013 | Begic | .............. | A47B 96/067 248/225.11 |
| 2017/0318986 A1 | 11/2017 | Santarelli | | |
| 2020/0324708 A1 | 10/2020 | Johnson | | |

* cited by examiner

MULTIPURPOSE RAIL SYSTEM

CROSS-REFERENCE TO RELATED APPLICATION

This application claims the benefit of U.S. Provisional Application No. 62/834,393 filed Apr. 15, 2019.

This application is a continuation of U.S. application Ser. No. 16/849,500, filed Apr. 15, 2020.

BACKGROUND

Currently, rail storage systems are designed to be used in a garage or shed to store various tools and products found in the home. The rail storage systems usually include components that can be modular to allow for differently sized objects to be stored by the rail systems. For example, the rail storage systems may include different attachment means that can be secured to the rail to allow a user to configure the system how they would like. If the user wanted to store the same items at a different location, they would likely need to set up another rail storage system in the same exact configuration to ensure everything would fit. Further, when a rail storage system is configured for a particular set of items, storing new items would require a reconfiguration of the rail storage system to store the new items.

A multipurpose rail system that includes rails having similar configurations and accessories that are adapted to secure to any of the rails, regardless of where they are, is needed.

DETAILED DESCRIPTION

Figure 1:
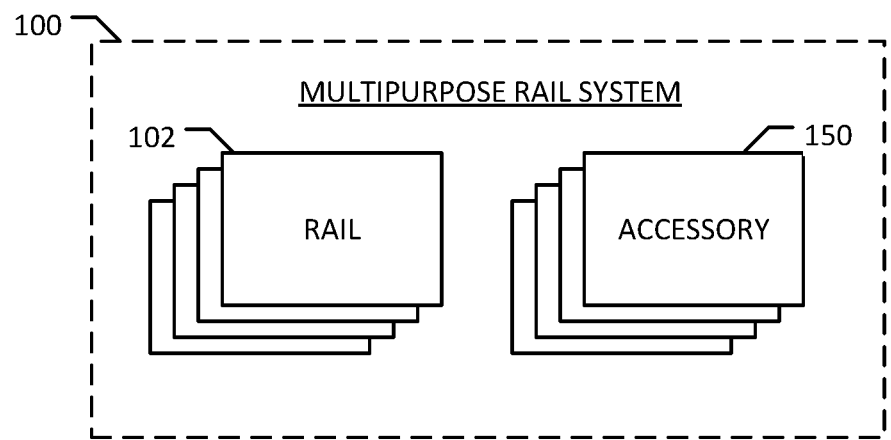
FIG. 1 is a block diagram of a multipurpose rail system according to one embodiment of the present invention.

Embodiments of the present invention include a multipurpose rail system. The multipurpose rail system can include, but is not limited to, at least one rail and at least one accessory configured to removably couple to the at least one rail. Typically, the rail can be secured to a solid structure where a user may wish to use the at least one accessory. For example, the rail may be coupled to an interior of a boat so that a user may use a grill on the boat. In another example, multiple rails may be coupled to an exterior of a camper to allow a user to setup an outdoor kitchen with several accessories. For instance, a stovetop, a cutting board, and a wash station may be coupled to the rails attached to the camper.

In one embodiment, the rails can include a main body, an upper flange extending vertically upward from a top of the main body, and a lower flange extending vertically downward from a bottom of the main body. The upper flange and the lower flange can be located on a backside of the main body. The rails can be manufactured to have a variety of different lengths, depths, and widths. Typically, the rails can be manufactured from a rigid material. For instance, metals and rigid plastics may be implemented. In one example, the rails can be manufactured from a single sheet of metal and stamped into shape. Of note, slots and holes of the rail can be punched before the sheet of metal is stamped.

The rails can further include a plurality of slots. The plurality of slots can be implemented to receive a protrusion (or tab) therethrough to couple an accessory to the rail. As can be appreciated, accessories can be adapted to include one or more protrusions for removably inserting into one of the plurality of slots for coupling said accessory to the rail. For example, a camping burner stove may be retrofitted with an adapter having a pair of protrusions to couple the burner stove to the rail. The plurality of slots can typically be located on an upper portion of the rail. As can be appreciated, a length of the rail can determine the number of slots.

In one embodiment, the plurality of slots can have a generally elongated stadium shape. In some embodiments, the plurality of slots can have a substantially rectangular shape. It is to be appreciated that other shapes for the slots are contemplated and not outside the scope of the present invention.

The slots can be located at an interface between the main body and the upper flange of the rail. The slots can partially extend into a topside of the main body and partially into the upper flange. In one example embodiment, the slots can be approximately 2 inches long and extend a ¼ inch into both the main body and the upper flange. By partially extending into the upper flange of the rail, a user can more easily insert the protrusions of an accessory into the slots. As an example, the protrusion would not have to come straight down into the slot, but can be inserted at an angle in addition to being inserted straight down into the slot. The design and placement of the slots can aid a user when attaching protrusions to the rails.

The accessories can include protrusions that can be configured to be inserted into and removed from the slots. The protrusions can allow for the accessories to be placed where a user prefers. For instance, a user may have a rail of substantial length to allow for multiple accessories to attach thereto. In some embodiments, the protrusions may include an engagement mechanism to securely keep the protrusion inside a slot. As can be appreciated, the engagement mechanism can be configured to allow the protrusion to be removed from the slot when warranted.

In one embodiment, the multipurpose rail system can include, but is not limited to a rail and an accessory. The rail can be defined by a main body, an upper flange, a lower flange, and a plurality of slots. The main body can have a substantially rectangular cross-section. The upper flange can extend vertically from a top back edge of the main body. The lower flange can extend vertically from a bottom back edge of the main body. The plurality of slots can be spaced equidistantly along a length of the rail. Each one of the plurality of slots can partially extend into both (i) the top back edge of the main body and (ii) the upper flange. The accessory can include at least one protrusion. The at least one protrusion can be configured to be removably inserted into one of the plurality of slots of the rail. More rails similar to the rail can be included in the system along with multiple accessories each configured to mate with the slots of the rails.

In another embodiment, the multipurpose rail system can include, but is not limited to, a plurality of rails and a plurality of accessories. The plurality of rails can each be defined by a main body, an upper flange, a lower flange, and a plurality of slots. The main body can have a substantially rectangular cross-section. The upper flange can extend vertically upwards from the main body. The lower flange can extend vertically downwards from the main body. The plurality of slots can be located at an interface between the upper flange and the main body. Each one of the plurality of slots can partially extend into both the upper flange and the main body. The plurality of accessories can each include at least one protrusion adapted to fit into the plurality of slots.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Multipurpose Rail System

Referring to FIG. 1, a block diagram of one embodiment of a multipurpose rail system is illustrated. The multipurpose rail system 100 can be implemented in a variety of different locations to provide a means for quickly and securely attaching an object in said location. For instance, a rail of the system 100 may be mounted on a side of a camper to allow a user to attach a stove quickly and securely to the camper. In another instance, a rail of the system 100 can be mounted inside a van to provide quick attachment of shelving to an interior of the van where the shelving can be quickly removed when needed.

As shown, the multipurpose rail system 100 can include, but is not limited to, one or more rails 102 and one or more accessories 150. Each of the one or more accessories 150 can be adapted to removably couple to each of the one or more rails 102.

Figure 3:
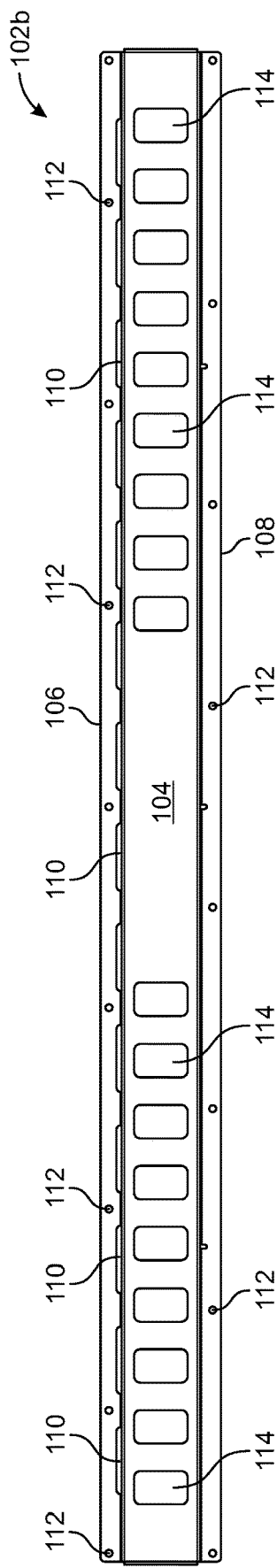
FIG. 3 is a front view of a rail of a multipurpose rail system according to one embodiment of the present invention.
Figure 4:
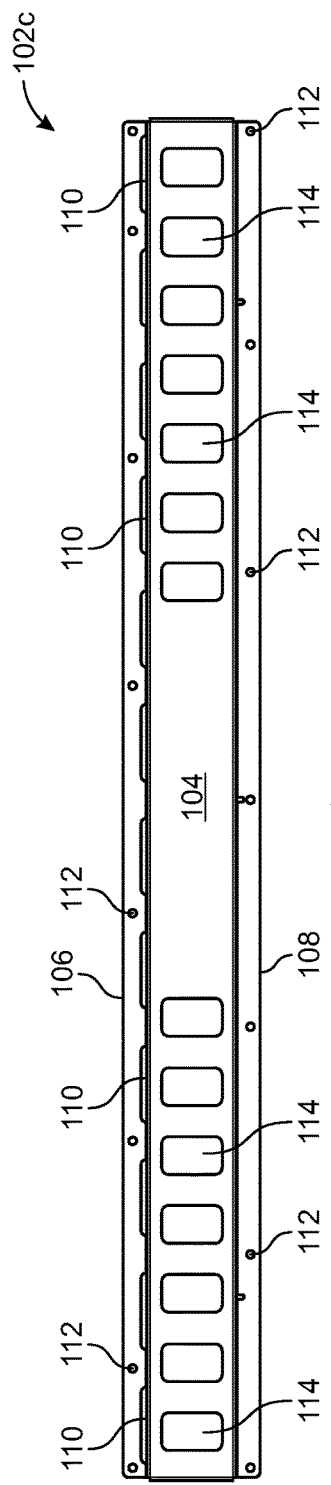
FIG. 4 is a front view of another rail of a multipurpose rail system according to one embodiment of the present invention.
Figure 5:
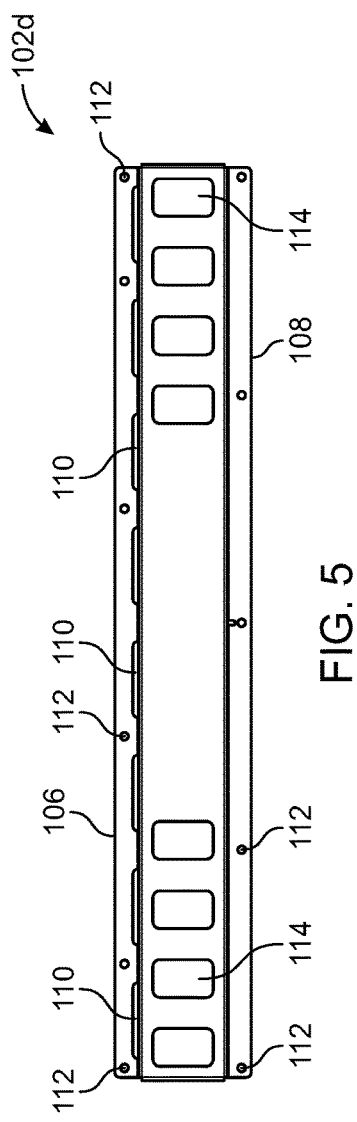
FIG. 5 is a front view of yet another rail of a multipurpose rail system according to one embodiment of the present invention.

Referring to FIGS. 2A-2E, detailed diagrams of a first rail 102a that can be implemented in the multipurpose rail system 100 are illustrated. Of note, the first rail 102a illustrated in FIGS. 2A-2E is one example embodiment of a rail 102 of the multipurpose rail system 100. FIGS. 3-5 include detailed diagrams of various embodiments of rails that can be implemented in the multipurpose rail system 100. Typically, a length and number of slots of each rail can be the difference between the illustrated embodiments. Of note, embodiments are contemplated where various aspects of the rail can be enlarged or reduced in size. For instance, flanges of the rail can be increased in size in some embodiments.

Figure 2A:
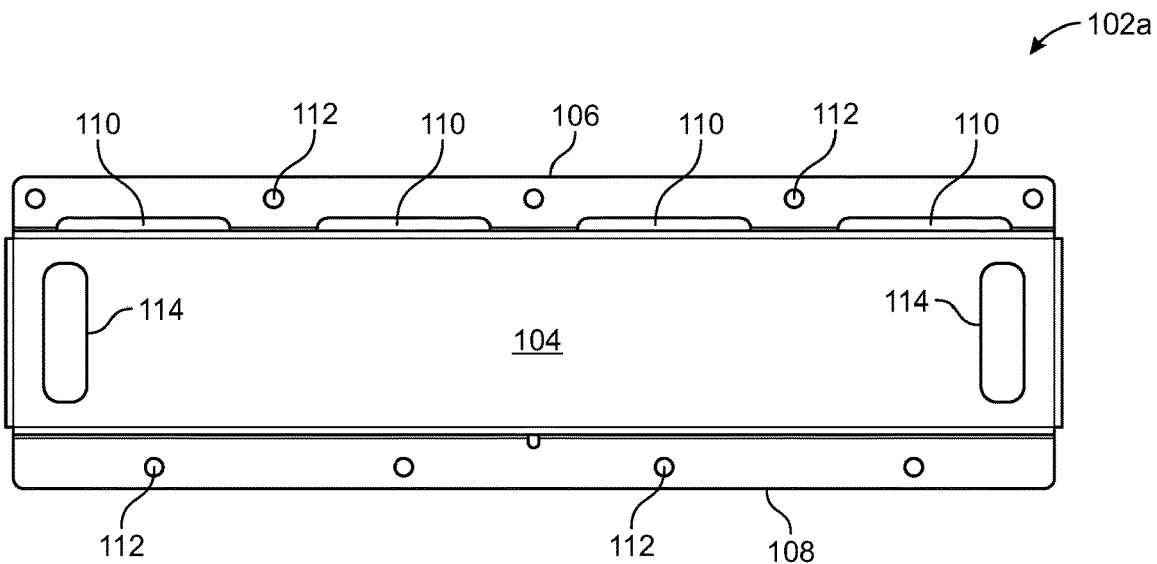
FIGS. 2A-2E are various views of a rail of a multipurpose rail system according to one embodiment of the present invention.

Referring to FIG. 2A, a front view of the first rail 102a is illustrated. As shown, the first rail 102a can include, but is not limited to, a main body 104, an upper flange 106, a lower flange 108, and a plurality of slots 110. Typically, the components of the first rail 102a can be manufactured from a single piece of rigid material. The upper flange 106 can extend vertically up from a top back edge of the main body 104 and the lower flange 108 can extend vertically down from a bottom back edge of the main body 104. The upper flange 106 and the lower flange 108 can each include a plurality of apertures (or holes) 112 for receiving a fastener therethrough. Of note, fasteners (e.g., screws, nails, etc.) can be implemented to secure the first rail 102a to an object. For instance, the first rail 102a may be secured to an exterior of a camper. In some embodiments, to reduce an overall weight of the rail, the main body 104 may include one or more cutouts 114.

The main body 104 of the first rail 102a can be defined by a substantially rectangular cross-section. In some embodiments, the first rail 102a may be formed by stamping a flat sheet of rigid material into the shown shape. Although not explicitly shown, the main body 104 can include a bottom side, a top side, a left side, a right side, and a front side. The main body 104 generally does not include a back side such that the main body 104 can be open on the back side. Of note, this can cut down on a total weight of the rails 102.

Figure 2B:
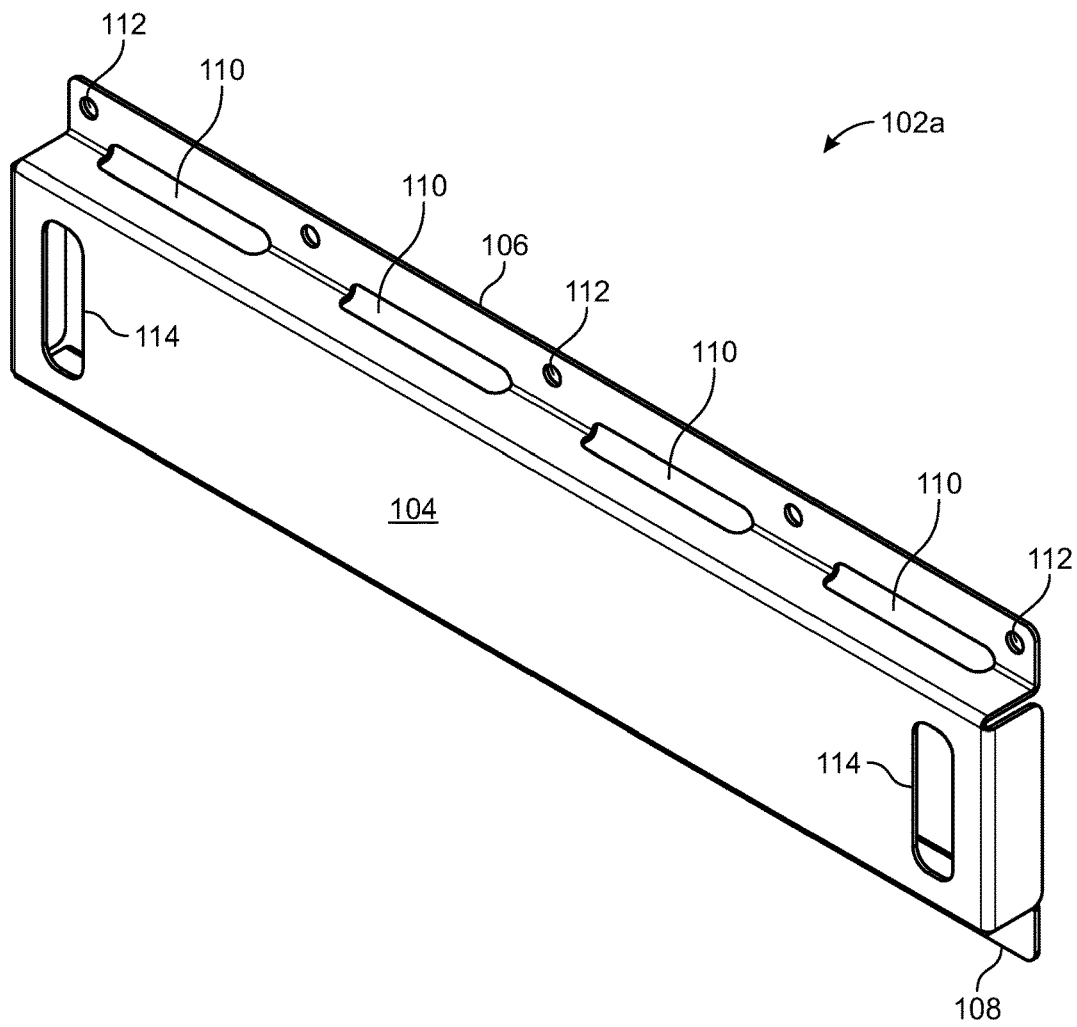

Referring to FIG. 2B, a front perspective view of the first rail 102a is illustrated. As shown, each of the plurality of slots 110 can have a substantially stadium shape. Of note, other shapes for the slots 110 are contemplated and not outside a scope of the present invention. Each of the plurality of slots 110 can be located proximate a top back edge of the main body 104 and can extend vertically into the upper flange 106. As shown, the slots 110 can each extend into the top back edge of the main body 104 and up into the vertical flange 106. Stated alternatively, each of the slots 110 can partially extend into the main body 104 and the upper flange 106.

Figure 2C:
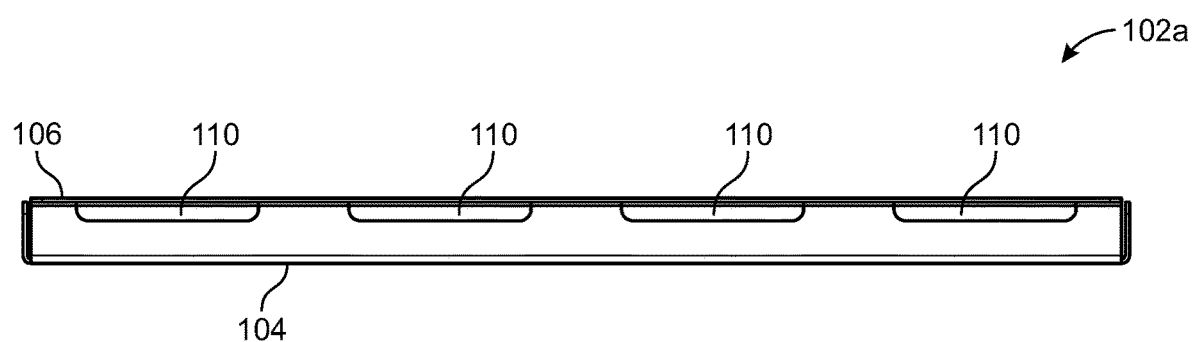

Referring to FIG. 2C, a top view of the first rail 102a is illustrated showing the top side of the main body 104. As shown, the plurality of slots 110 can partially extend into a top back edge of the main body 104. Further shown, the top side of the first rail 102a can have a substantially rectangular shape.

Figure 2D:
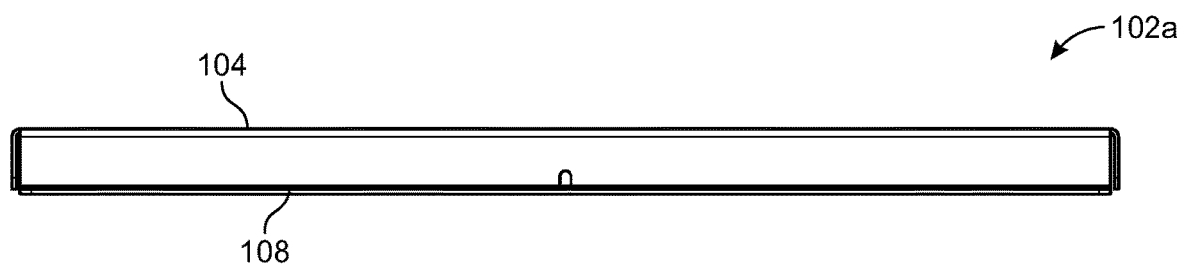

Referring to FIG. 2D, a bottom view of the first rail 102a is illustrated showing the bottom side of the main body 104. Similar to the top side, the bottom side of the main body 104 can have a substantially rectangular shape.

Figure 2E:
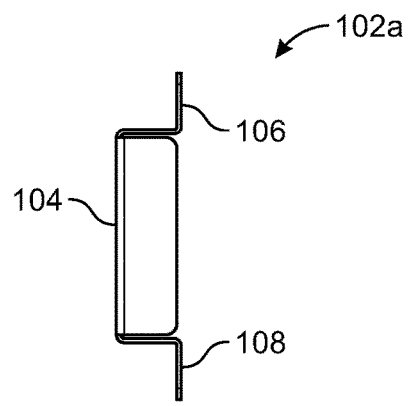

Referring to FIG. 2E, a side view of the first rail 102a is illustrated. As shown, the upper flange 106 can extend vertically upwards away from the main body 104 of the first rail 102a. The lower flange 108 can extend vertically downwards away from the main body 104 of the first rail 102a. Looking from a side of the first rail 102a, the first rail 102a can have a substantially rectangular cross-section.

In one example embodiment, the first rail 102a can have the following dimensions. The main body 104 can be approximately 12 inches long by 2.3 inches wide by 0.7 inches deep. A top side and a bottom side can each be approximately 0.7 inches wide by 12 inches long. The upper flange 106 and the upper flange 108 can each be 0.7 wide by 12 inches long. A total height of the first rail 102a may be 3.6 inches. The slots may be approximately 2 inches long and extend approximately 0.25 inches into both the top side of the main body 104 and the upper flange 106. The plurality of cutouts 114 may each be approximately 1.6 inches long by 0.50 inches wide.

Referring to FIG. 3, a front view of a second rail 102b is illustrated. As shown, the second rail 102b can include a main body 104, an upper flange 106, a lower flange 108, a plurality of slots 110, a plurality of apertures 112, and a plurality of cutouts 114. The extended rail 102b can be longer than the first rail 102a. Of note, each of the components 104-114 can be implemented substantially similar to the components of the first rail 102a. As shown, the second rail 102b can have more slots 110 than the first rail 102a. Components of the second rail 102b can have approximately similar dimensions to the first rail 102a, but the second rail 102b may be approximately 45 inches long.

Referring to FIG. 4, a front view of a third rail 102c is illustrated. As shown, the third rail 102c can include a main body 104, an upper flange 106, a lower flange 108, a plurality of slots 110, a plurality of apertures 112, and a plurality of cutouts 114. As shown, the third rail 102c can have more slots 110 than the first rail 102a. The third rail 102c can be shorter than the second rail 102b and longer than the first rail 102a. Components of the third rail 102c can have approximately similar dimensions to the first rail 102a, but the third rail 102c may be approximately 36 inches long. As shown, the third rail 102c can have more slots 110 than the first rail 102a.

Referring to FIG. 5, a front view of a fourth rail 102d is illustrated. As shown, the fourth rail 102d can include a main body 104, an upper flange 106, a lower flange 108, a plurality of slots 110, a plurality of apertures 112, and a plurality of cutouts 114. The fourth rail 102d can be shorter than the second rail 102b and 102c and can be longer than the first rail 102a. Components of the fourth rail 102d can have approximately similar dimensions to the first rail 102a, but the fourth rail 102d may be approximately 24 inches long. As shown, the fourth rail 102d can have more slots 110 than the first rail 102a.

Figure 6:
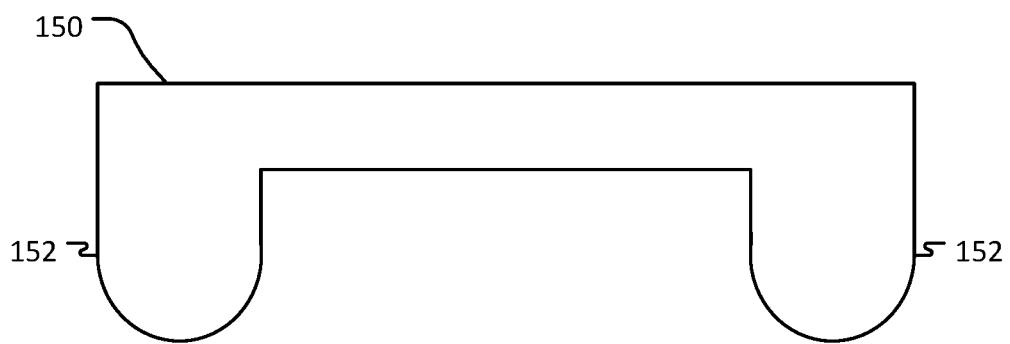
FIG. 6 is a back view of a protrusion of an accessory according to one embodiment of the present invention.

Referring to FIG. 6, a close-up back view of a pair of protrusions 152 are illustrated. As can be appreciated, the protrusions 152 can be integrated with or retrofitted to an accessory 150. Although two protrusions are shown, it is to be appreciated that the number of protrusions 152 can be based on a size of the accessory. For instance, a cup holder accessory may only need one protrusion and a grill accessory may need 4 or more protrusions. In another instance, a food tray accessory may include three protrusions to provide support for heavy foods. The protrusions 152 can be configured to mate with one of the plurality of slots 110 of each of the rails 102.

Typically, the protrusions 152 can be configured to be inserted into and removed from the slots 110 to allow for the accessories 150a-150n to be placed where a user prefers. In some embodiments, the protrusions 152 may be configured to include a portion of the protrusion that may "lock" the protrusion into the slot to keep the protrusion more securely 152 inside a slot 110. As can be appreciated, these types of protrusions 152 can be configured to allow the protrusion 152 to be removed from the slot when warranted.

Figure 7:
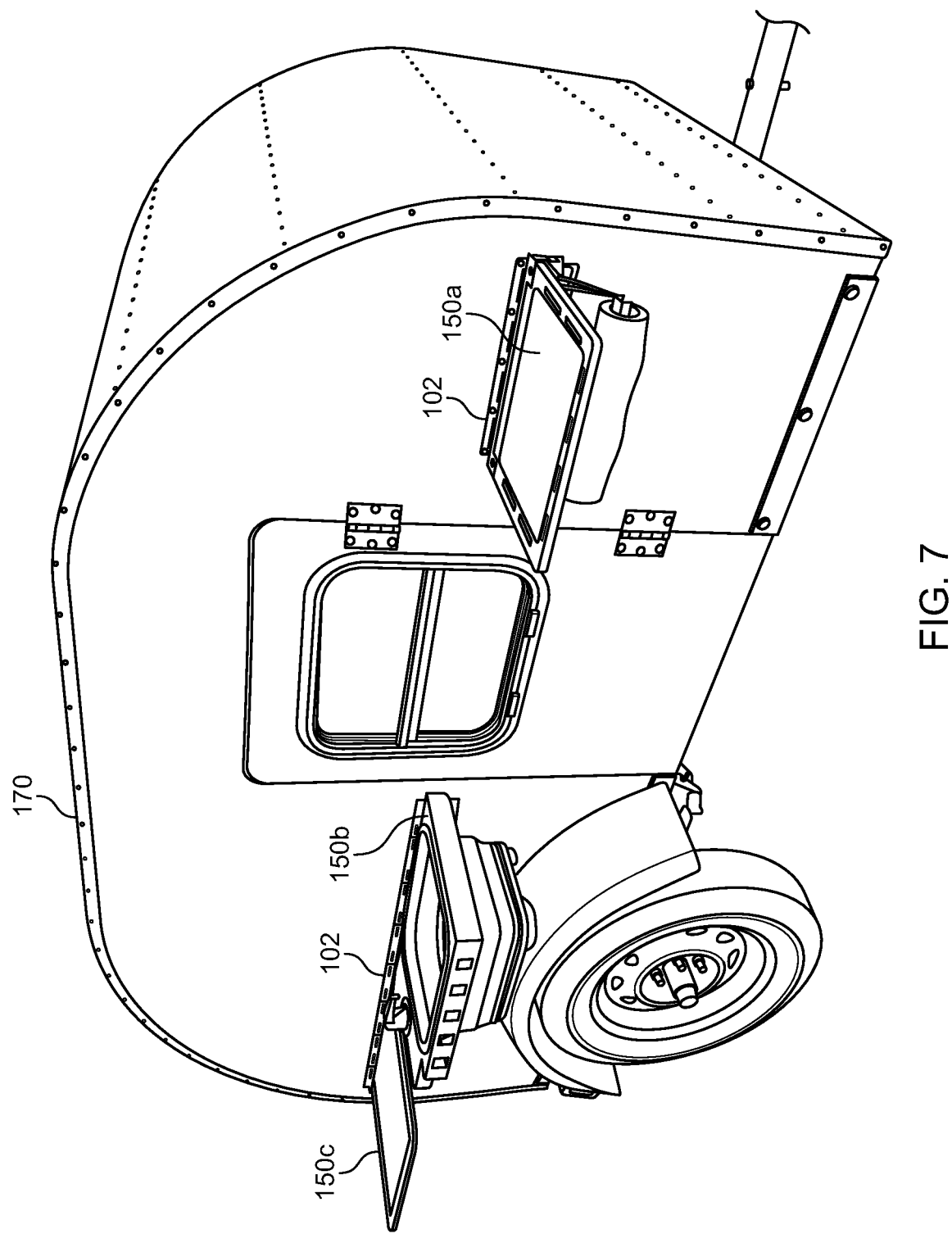
FIG. 7 is a perspective view of a multipurpose rail system in combination with a trailer camper according to one embodiment of the present invention.
Figure 8A:
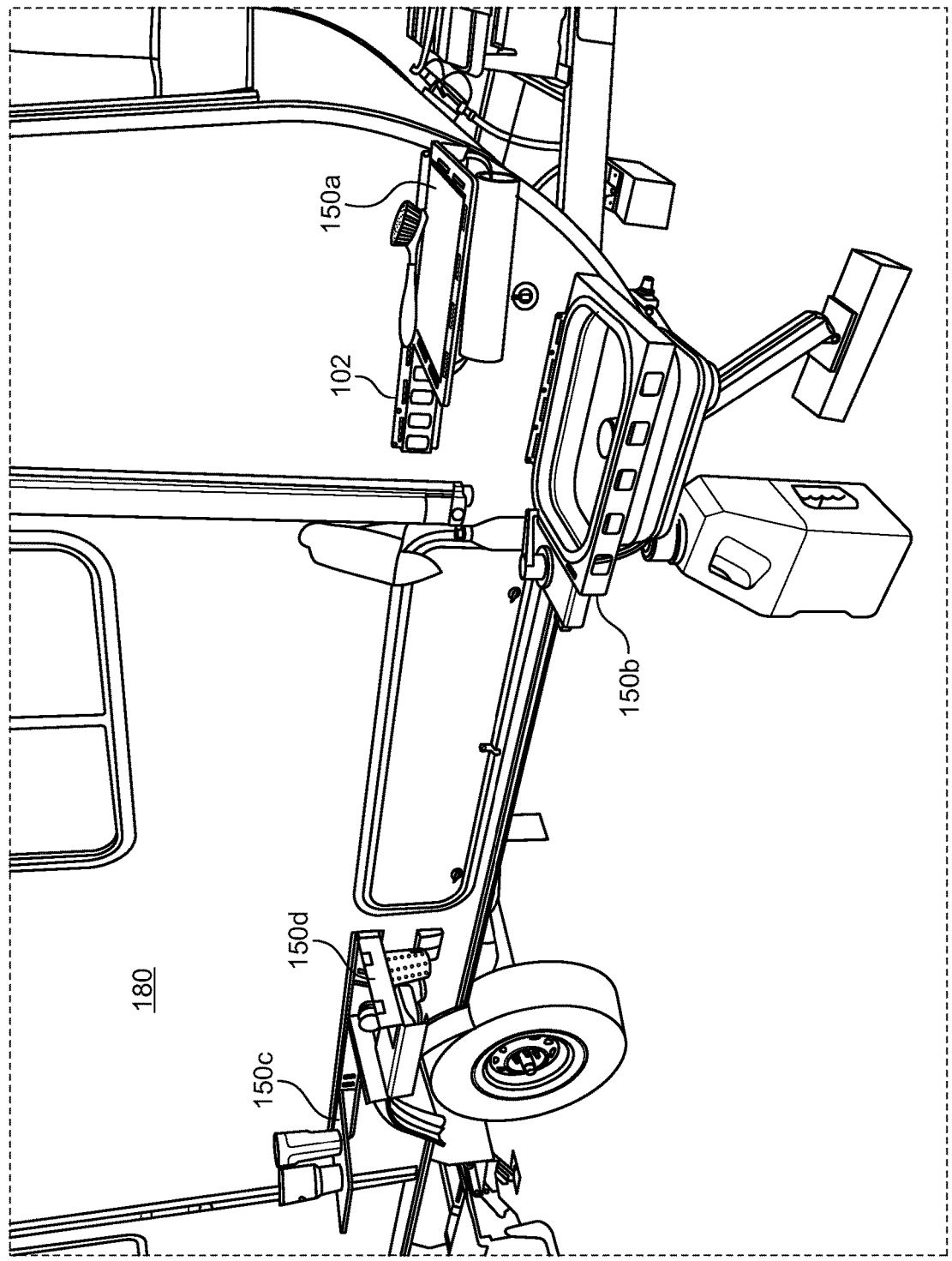
FIGS. 8A-8B are perspective views of a multipurpose rail system in combination with a $5^{th}$ wheel camper according to one embodiment of the present invention.
Figure 8B:
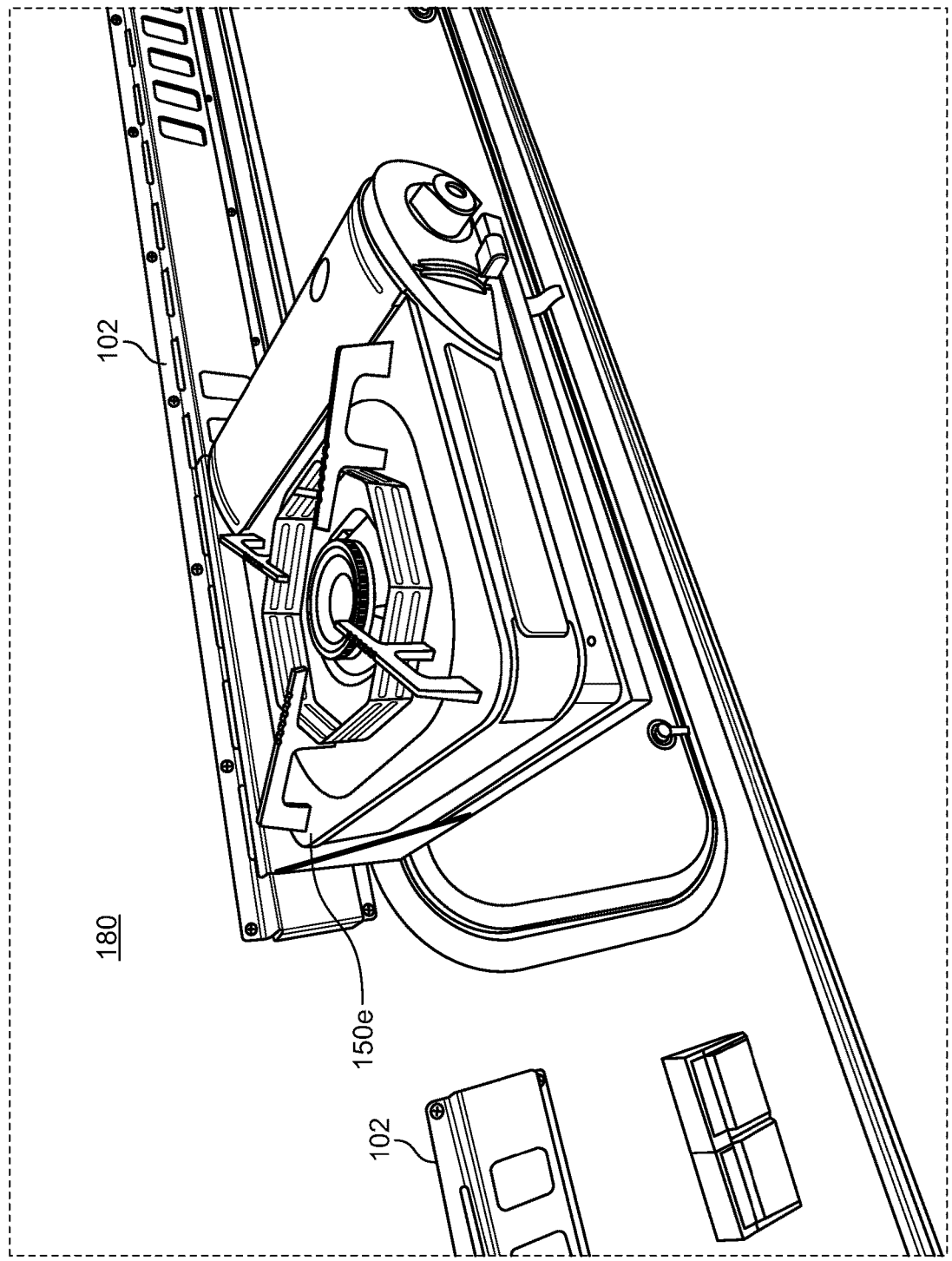
Figure 9:
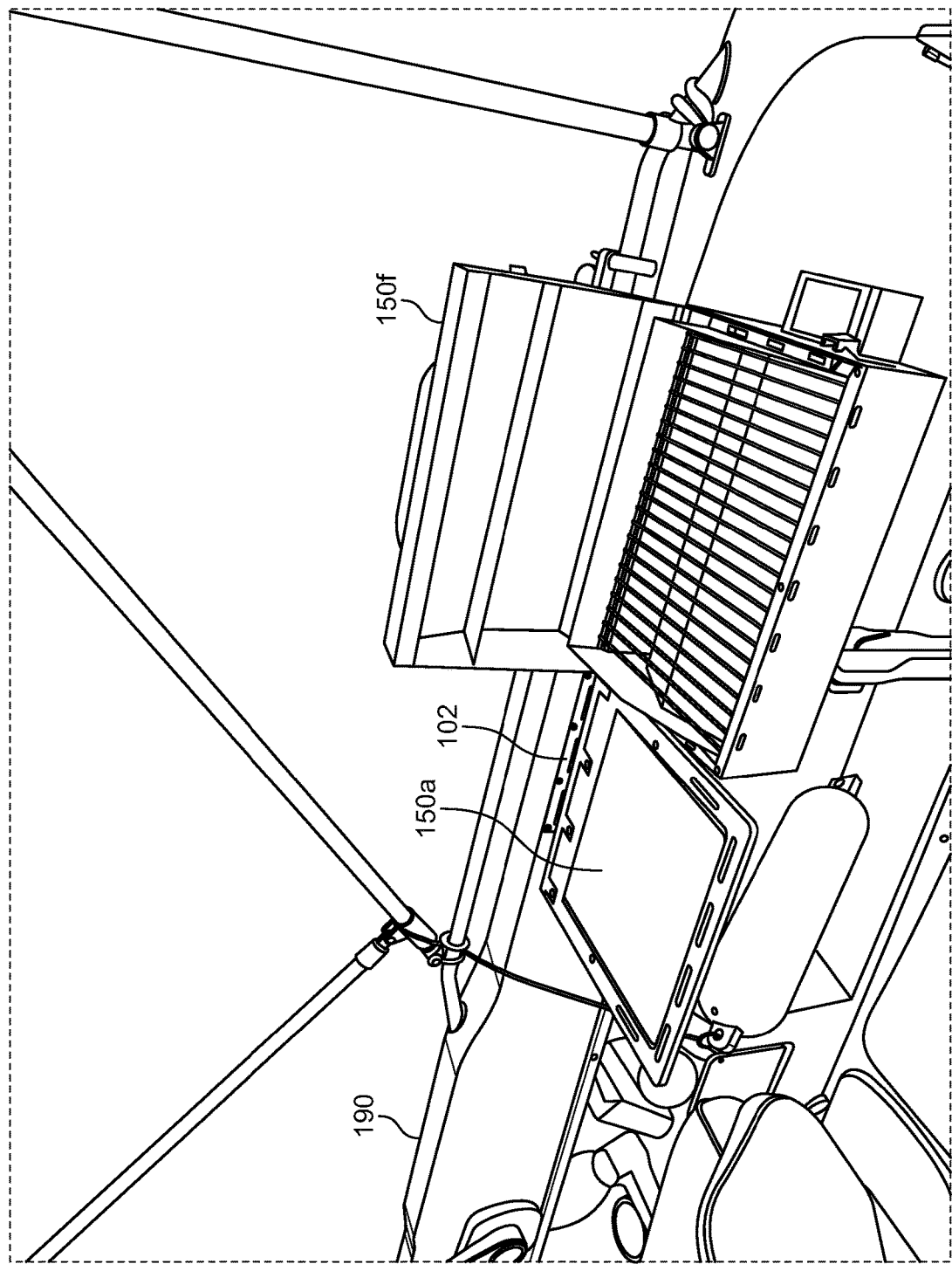
FIG. 9 is a perspective view of a multipurpose rail system in combination with a boat according to one embodiment of the present invention.

Of note, various accessories 150a-150n are shown in FIGS. 7-9 coupled to rails 102. It is to be appreciated that these accessories are shown for illustrative purposes only and not meant to be limiting. Any number of types of accessories may be implemented with the multipurpose rail system 100. For instance, a stove may be implemented or a cooler can be implemented with the multipurpose rail system 100. Typically, any type of accessory may be implemented assuming the accessory may be retrofitted or have integrated one or more protrusions 152 (described previously) to couple to the slots 110 of the rails 102.

Referring to FIG. 7, a detailed diagram of some rails 102 and various accessories 150 of the multipurpose rail system 100 being implemented with a camper trailer 170 is illustrated. As shown, a pair of rails 102 are attached to an exterior of the camper trailer 170. A table accessory 150a including a paper towel holder is shown attached to one of the rails 102. A wash station accessory 150b and a cutting board accessory 150c are shown attached to another one of the rails 102. As can be appreciated, when a user is ready to travel, the user may remove the accessories 150a-150c from the rails and store them away for travel. Further, the illustrated configuration of the accessories 150a-150c is one example configuration. Since each of the accessories 150a-150c can be coupled to either of the rails 102, a user can setup the accessories 150a-150c how they would like.

Referring to FIGS. 8A-8B, detailed diagrams of some rails 102 and various accessories 150 of the multipurpose rail system 100 being implemented with a 5$^{th}$ wheel camper 180 are illustrated. As shown in FIG. 8A, a plurality of rails 102 can be coupled to an exterior of the camper 180. Of note, the rails 102 can be located in a variety of different places and can be selected by a user. As shown, the table accessory 150a with the paper towel holder can be located on a first rail 102, the wash station accessory 150b can be attached to a second rail 102 located below the first rail 102. A shelf accessor 150d can be located on a third rail 102 in addition to a utensil accessory 150e also being attached to the third rail 102. As previously mentioned, each of the accessories 150a-150e may be attached to any one of the rails 102 attached to the camper 180.

As shown in FIG. 8B, a close-up view of a stove top accessory 150f coupled to one of the rails 102 on the camper 180 is illustrated. As can be appreciated, a user may remove the stove top accessory 150f when they are done cooking or when they are ready to travel.

Referring to FIG. 9, a detailed diagram of some rails 102 and various accessories 150 of the multipurpose rail system 100 being implemented with a boat 190 is illustrated. As shown, a rail 102 can be coupled to an interior of the boat 190 such that a user can grill a meal on their boat. A grill accessory 150g can be coupled to the rail 102. Of note, if the boat 190 was being used by an owner or friend of one of the campers 170, 180, the grill accessory 150g could be used with one of the campers 170, 180 as well. A cutting board accessory 150n is also shown being secured to the rail 102 inside the boat 190. As can be appreciated, the accessories 150a-150n can be transferred and implemented between rails 102 located in a variety of different places.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A multipurpose rail system comprising:
A first rail being defined by:
   a main body;
   an upper flange extending up vertically from a top back edge of the main body;
   a lower flange extending down vertically from a bottom back edge of the main body; and
   a plurality of slots, each one of the plurality of slots partially extending into both (i) the top back edge of the main body, and (ii) the upper flange.

2. The multipurpose rail system of claim 1, the system further comprising:
a second rail being defined by:
   a main body;
   an upper flange extending up vertically from a top back edge of the main body;
   a lower flange extending down vertically from a bottom back edge of the main body;
   a plurality of slots spaced, each one of the plurality of slots partially extending into both (i) the top back edge of the main body, and (ii) the upper flange.

3. The multipurpose rail system of claim 2, wherein the first rail is longer than the second rail.

4. The multipurpose rail system of claim 1, wherein each of the plurality of slots have a substantially stadium shape.

5. The multipurpose rail system of claim 1, wherein the upper flange and the lower flange each include a plurality of holes for receiving fasteners therethrough.

6. The multipurpose rail system of claim 1, wherein a first accessory including at least one protrusion is adapted to be removably inserted into one of the plurality of slots of the first rail.

7. The multipurpose rail system of claim 6, wherein a second accessory including at least one protrusion is adapted to be removably inserted into one of the plurality of slots of the first rail.

8. The multipurpose rail system of claim 1, wherein each of the plurality of slots are approximately 2 inches long and extend approximately ¼ inch into both the main body and the upper flange.

9. The multipurpose rail system of claim 1, wherein the main body includes a plurality of cutouts.

10. A multipurpose rail system comprising:
a plurality of rails, each of the rails being defined by:
   a main body;
   an upper flange extending vertically upwards from the main body;
   a lower flange extending vertically downwards from the main body;
   a plurality of slots being located at an interface between the upper flange and the main body;
   wherein each one of the plurality of slots partially extends into both (i) the upper flange, and (ii) the main body.

11. The multipurpose rail system of claim 10, wherein a first rail of the plurality of rails has a different length than a second rail of the plurality of rails.

12. The multipurpose rail system of claim 10, wherein a first rail of the plurality of rails is equal in length to a second rail of the plurality of rails.

13. The multipurpose rail system of claim 10, wherein each one of the plurality of slots for each one of the plurality of rails are substantially stadium shaped.

14. The multipurpose rail system of claim 10, wherein a first accessory is coupled to the first rail and a second accessory is coupled to the second rail.

15. The multipurpose rail system of claim 10, wherein each of the plurality of rails further include two or more holes for receiving a fastener therethrough.

* * * * *